United States Patent [19]

Khanarian et al.

[11] Patent Number: 5,061,028
[45] Date of Patent: Oct. 29, 1991

[54] POLYMERIC WAVEGUIDES WITH BIDIRECTIONAL POLING FOR RADIATION PHASE-MATCHING

[75] Inventors: Garo Khanarian, Berkley Heights; Pascal Landi, Summit; David Haas, Springfield, all of N.J.; Robert Norwood, Bethlehem, Pa.

[73] Assignee: Hoechst Celanese Corp., Somerville, N.J.

[21] Appl. No.: 601,831

[22] Filed: Oct. 23, 1990

[51] Int. Cl.⁵ .............................................. G02B 6/10
[52] U.S. Cl. .................................. 385/132; 385/143; 385/145; 359/332
[58] Field of Search ............... 350/96.11, 96.12, 96.13, 350/96.14, 96.29, 96.34; 307/425–430; 252/582, 587, 589

[56] References Cited

U.S. PATENT DOCUMENTS

| | | | |
|---|---|---|---|
| 4,801,670 | 1/1989 | DeMartino et al. | 526/263 |
| 4,865,406 | 9/1989 | Khanarian et al. | 350/96.12 |
| 4,946,235 | 8/1990 | Scozzafava et al. | 350/96.34 |
| 4,971,416 | 11/1990 | Khanarian et al. | 350/96.12 |
| 5,006,729 | 4/1991 | Meijer et al. | 307/425 |
| 5,007,696 | 4/1991 | Thackara et al. | 350/96.14 |

*Primary Examiner*—Frank Gonzalez
*Attorney, Agent, or Firm*—DePaoli & O'Brien

[57] ABSTRACT

This invention provides process embodiments for fabrication of organic optical waveguides. A preferred invention optical waveguide consists of a thin film matrix of three electrodes, one of which has a spatial periodic structure, and a side chain polymeric waveguiding medium positioned between two side chain polymeric cladding layers. The electrodes are adapted to apply electric fields of opposite polarity and to pole the polymer side chains bidirectionally in a noncentrosymmetric orientation of periodic reverse polarity. The waveguiding medium and cladding thin films exhibit second order nonlinear optical susceptibility $\chi^{(2)}$, and are adapted to phase-match propagating radiation waves.

18 Claims, 1 Drawing Sheet

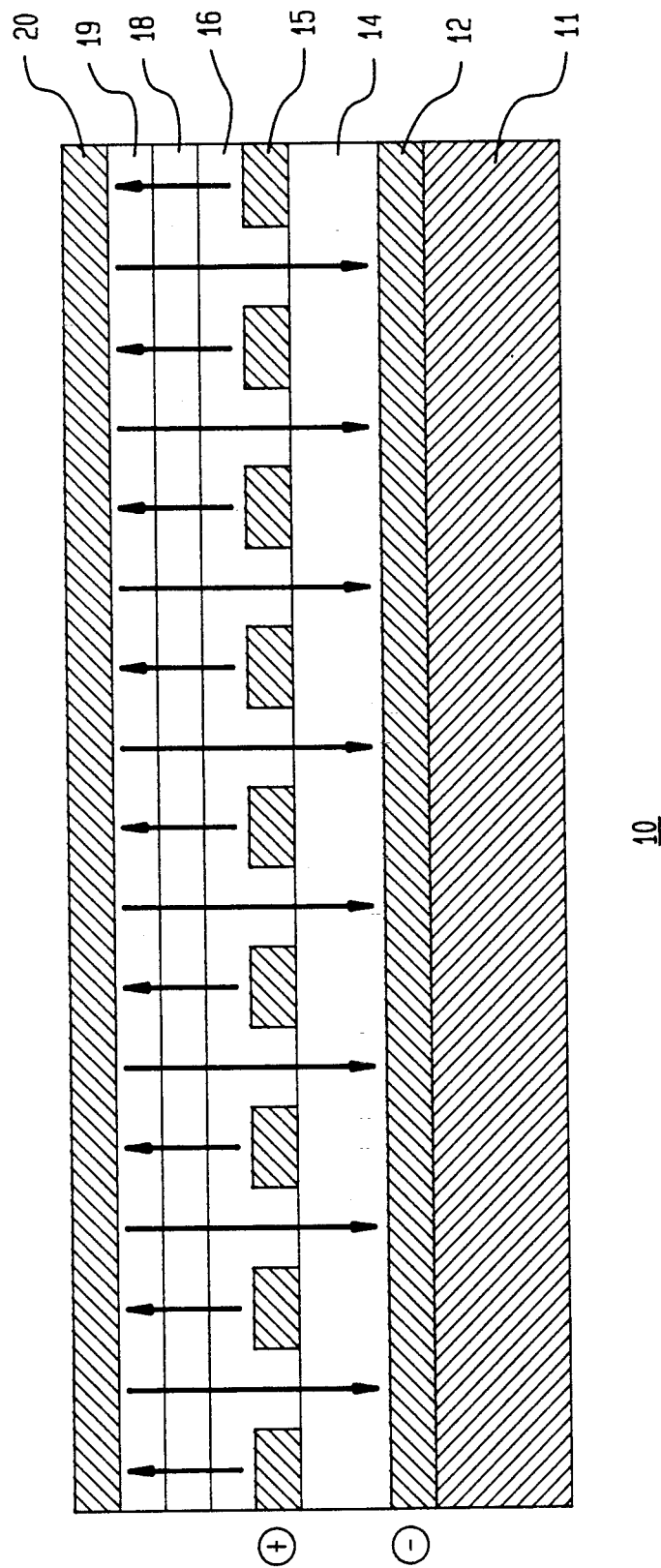

POLYMERIC WAVEGUIDES WITH BIDIRECTIONAL POLING FOR RADIATION PHASE-MATCHING

This invention was made with Government support under Contract No. F30602-87-C-0218 awarded by the Department of Defense (DOD). The Government has certain rights in this invention.

BACKGROUND OF THE INVENTION

Optical waveguides consist of a transparent waveguiding core surrounded by transparent materials of lower indices of refraction. Several general methods are utilized for fabrication of optical waveguides.

Optical waveguides fabricated in GaAs/AlGaAs structures by laser-assisted etching has been reported in Integrated And Guided-Wave Optics, 1989 Technical Digest Series, 4, 64–67 (Optical Society of America).

U.S. Pat. No. 4,842,677 describes excimer laser etching of high resolution conductive patterns involving the use of an organic polymeric resist. Other publications relating to photoablation of organic polymers include J. Appl. Phys., 66(3), 1411 (1989).

Methods of fabricating organic waveguides are a newly evolving technology. A review article in Journal Of Lightwave Technology, 7(10), 1445 (1989) describes several polymeric channel waveguide fabrication routes, such as etching methods which include wet chemistry etching, reactive ion etching, excimer laser ablation, and the like.

New developments in organic waveguide technology involve the use of polymers with side chains that exhibit second order nonlinear optical susceptibility. Side chain polymers are described in U.S. Pat. Nos. 4,801,670; 4,804,255; 4,808,332; 4,882,865; and 4,865,406.

When a side chain polymer waveguiding thin film medium is subjected to an electric field to induce a noncentrosymmetric molecular orientation of the polymer side chains, the waveguiding medium exhibits second order nonlinear optical susceptibility $\chi^{(2)}$. The electrooptic activity of the side chain polymer waveguiding medium is proportional to the degree of noncentrosymmetric molecular orientation induced by electric field poling, which in turn is proportional to the strength of the applied electric field.

For wave interactions in a thin film waveguiding medium to be efficient, the velocities of the different electromagnetic waves must be matched. U.S. Pat. No. 4,865,406 describes a frequency doubling polymeric waveguide in which phase-matching of propagating light waves is achieved with a periodic second order nonlinear optically responsive waveguiding medium.

There is continuing interest in the development of new and improved techniques for the fabrication of organic optical waveguides which overcome some of the inherent deficiencies of optical waveguide formation in transparent organic media, and which provide waveguides exhibiting an improved wave interaction efficiency.

Accordingly, it is an object of this invention to provide a method for the production of noncentrosymmetric polymeric optical waveguides by electric field poling with a novel combination of electrodes.

It is a further object of this invention to provide side chain polymeric optical waveguides which have a two-dimensional channel waveguiding structure, and which have the polymer side chains poled bidirectionally to provide a noncentrosymmetric orientation of periodic reverse polarity for efficient phase-matching of propagating radiation waves.

Other objects and advantages of the present invention shall become apparent from the accompanying description and Examples.

DESCRIPTION OF THE INVENTION

One or more objects of the present invention are accomplished by the provision of an optical waveguide which has a thin film laminated matrix comprising:

(a) a substrate which supports a first electrode layer;
(b) a dielectric buffer layer which is in coextensive proximity with the electrode layer;
(c) a second electrode layer having a spatial periodic structure in proximity with the buffer layer;
(d) a potable organic waveguiding medium layer in proximity with the second electrode layer and buffer layer; and
(e) a third electrode layer in proximity with the organic waveguiding medium;

wherein the first and second electrodes are adapted to apply electric fields of opposite polarity in conjunction with the third electrode functioning as a zero potential ground electrode, and the organic waveguiding medium has a bidirectional poled molecular configuration and a radiation wave phase-matching coherence length about equal to the periodicity of the second electrode.

An invention optical waveguide can be in the form of a slab waveguiding structure, or it can have a two-dimensional channel structure for single mode wave transmission.

An important aspect of an invention optical waveguide is a waveguiding thin film which has a reverse periodicity of poled organic molecules for phase-matching of different wave velocities. Electromagnetic radiation at different frequencies propagates at different velocities in a waveguiding medium. Efficient wave interaction in a waveguiding medium requires the different propagating electromagnetic waves to have equal velocities, i.e., the radiation waves must be phase-matched in the waveguiding medium. A periodic second order nonlinear optically responsive waveguiding medium provides the wave phase-matching function in a present invention optical waveguide module.

The required periodicity for a given wave interaction is determined by the inverse of the difference of the propagation constants of the waves:

$$\Lambda = \frac{2\pi}{\Delta k}$$

where $\Delta k = k_p^{(1)} - k_s^{(2)} - k_i^{(3)}$, and $k_p$ is the pump radiation constant, $k_s$ is the signal radiation constant, and $k_i$ is the idler radiation constant.

The above defined relationship applies wherein there are three propagating electromagnetic waves as in an all-optical parametric amplifier, or a harmonic generator where signal and idler waves are degenerate. An invention parametric oscillator phase-matches the propagation constants of the pump, signal and idler waves.

Electrooptic devices requiring wave phase-matching are TE-TM converters (phase-matching transverse electric and transverse magnetic propagation constants), and modulators (phase-matching optical and microwave signals). In these devices, $\Delta k = k^{TE} - k^{TM}$ or $\Delta k = k^{opt} - k^{micro}$.

In another embodiment this invention provides an optical waveguide which has a thin film laminated matrix comprising:

(a) a substrate which supports a first electrode layer;
(b) a dielectric buffer layer which is in coextensive proximity with the electrode layer;
(c) a second electrode having a spatial periodic structure in proximity with the buffer layer;
(d) a first thin film cladding of a polable side chain polymer in proximity with the second electrode layer and buffer layer.
(e) a waveguiding medium layer of a polable side chain polymer in coextensive contact with the first cladding layer and with a higher refractive index than the cladding layer;
(d) a second thin film cladding of a polable side chain polymer in coextensive contact with the waveguiding medium layer and with a lower refractive index than the waveguiding layer; and
(g) a third electrode in proximity with the second thin film cladding;

wherein the first and second electrodes are adapted to apply electric fields of opposite polarity in conjunction with the third electrode functioning as a zero potential ground electrode, and the waveguiding medium and thin film cladding polymers have a bidirectional poled molecular configuration of the polymer side chains and exhibit second order nonlinear optical susceptibility $\chi^{(2)}$, and have a radiation wave phase-matching coherence length about equal to the periodicity of the second electrode.

In a further embodiment this invention provides a method for fabricating an optical waveguide having a thin film laminated matrix which comprises:

(a) forming a first electrode layer on a supporting substrate;
(b) applying a dielectric buffer layer which is in coextensive proximity with the electrode layer;
(c) forming a second electrode layer having a spatial periodic structure in proximity with the buffer layer;
(d) forming a polable organic waveguiding medium layer in proximity with the second electrode layer and buffer layer; and
(e) forming a third electrode layer in proximity with the organic waveguiding medium;

wherein the first and second electrodes are adapted to apply electric fields of opposite polarity in conjunction with the third electrode functioning as a zero potential ground electrode, and the organic waveguiding medium is provided with a bidirectional poled molecular configuration and a radiation wave phase-matching coherence length about equal to the periodicity of the second electrode.

The organic waveguiding medium of an invention optical waveguide is transparent, preferably amorphous in physical properties, and exhibits nonlinear optical response. The waveguiding medium has a higher refractive index (e.g., 1.5) than the surrounding matrix which interfaces the waveguiding medium dimensions.

A present invention side chain polymeric waveguide with a two-dimensional channel structure is adapted to perform with an optical loss of less than about two decibels per centimeter under radiation wave propagating conditions, and exhibit a second order nonlinear optical susceptibility $\chi^{(2)}$ of at least about $1 \times 10^{-8}$ esu as measured at 1.91 $\mu$m excitation wavelength. A present invention two-dimensional channel waveguide structure typically will have dimensions in the range of about 1.5–8 $\mu$m × 1.5–8 $\mu$m × 0.5–5 cm.

Multiple polymeric thin films in a laminated matrix structure can be applied to the supporting substrate by conventional methods, such as spin coating, spraying, Langmuir-Blodgett deposition, and the like. The thin films typically will have a thickness between about 0.5–3 microns.

A supporting substrate in an invention waveguide can be constructed of any convenient non-conducting medium such as plastic, glass, or silicon.

A typical organic thin film waveguiding medium comprises a blend of a polymer host and a guest component. The nonlinear optical properties of the thin film can be controlled by the guest component alone, or both the host and the guest components can exhibit nonlinear optical susceptibility.

Illustrative of suitable host polymers are poly(methylmethacrylate), cellulose acetate, polysiloxane, polyacrylamide, polyacrylonitrile, and the like. The same type of polymers also are useful for application as cladding thin films in waveguides which have cladding layers.

Illustrative of suitable guest compounds are 4-nitroaniline, 2-methyl-4-nitroaniline, 4-N,N-dimethylamino-4'-nitrostilbene(DANS), and the like.

A present invention optical waveguide laminated matrix preferably has side chain polymers in the waveguiding medium and the cladding thin films which are characterized by a recurring monomeric unit corresponding to the formula:

where P' is a polymer main chain unit, S' is a flexible spacer group having a linear chain length of between about 2–20 atoms, M' is a pendant group which exhibits second order nonlinear optical susceptibility $\chi^{(2)}$, and where the pendant groups comprise at least about 25 weight percent of the polymer, and the polymer has a glass transition temperature of softening point about above about 40° C.

Among the preferred types of side chain polymers are those characterized by a recurring monomeric unit corresponding to the formula:

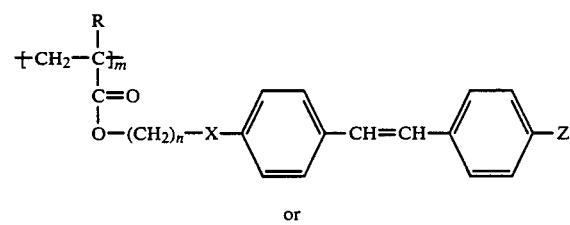

or

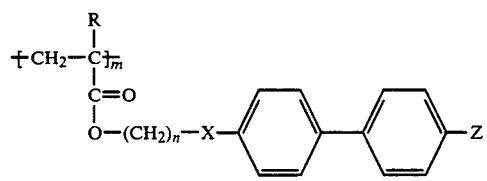

where m is an integer of at least 5; n is an integer between about 2–20; X is —NR—, —O— or —S—; R is hydrogen or a $C_1$-$C_4$ alkyl; and Z is —$NO_2$, —CN, —$CF_3$, —CH=$C(CN)_2$, —$C(CN)$=$C(CN)_2$ or —$SO_2CF_3$.

Side chain polymers of interest are described in U.S. Pat. Nos. 4,694,066; 4,762,912; 4,779,961; 4,801,670; and 4,808,332. Illustrative of side chain polymer species are poly[6-(4-nitrobiphenyloxy)hexyl methacrylate], poly(L-N-p-nitrophenyl-2-piperidinemethyl acrylate), and stilbene-containing polymers such as a copolymer of 4-[N-(2-methacroyloxyethyl)-N-methylamino]-4'-nitrostilbene and a $C_1$-$C_6$ alkyl acrylate or methacrylate:

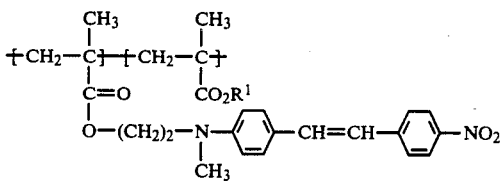

Useful amorphous side chain polymers are described in U.S. Pat. No. 5,002,361.

Poling of a present invention optical waveguide laminated matrix of side chain polymers in the waveguiding channel and the lining and cladding thin films can be accomplished conveniently by heating the matrix near its melting point or glass transition temperature, then applying two bipolar DC electric fields (e.g., 50-150 V/$\mu$m) to the matrix with the three electrode arrangement to align side chain dipoles in a uniaxial orientation with a periodic reverse polarity. The matrix then is cooled while the matrix is still under the influence of the applied DC electric fields. In this manner a stable and permanent molecular orientation is immobilized in a rigid structure within the periodically poled domains.

Thin film electrode layers in an optical waveguide laminated matrix typically are composed of a conductive medium such as aluminum, silver or gold. A thin film metal electrode can be applied by electron beam vacuum deposition means, and normally will have a thickness between about 0.1-1 micron. For quasi-phase-matching of propagating wave energy, the middle electrode of the three electrode set in an optical waveguide matrix has a spatial periodic grating pattern.

The buffer layer between the first and second electrodes in an invention optical waveguide can be composed of any suitable inorganic or organic dielectric material, which typically will be glass or a polymer such as polyurethane, polyester, polystyrene, polyamide, polyepoxide, and the like.

FIG. 1 consists of a cross-sectional side elevation view illustrating a fabricated optical waveguide as demonstrated in Example I in accordance with the present invention.

The following examples are further illustrative of the present invention. The optical waveguide device components are presented as being typical, and various modifications in design and operation can be derived in view of the foregoing disclosure within the scope of the invention.

EXAMPLE I

This Example illustrates the construction and operation of an optical frequency converting module as represented in FIG. 1.

A commercially available silicon dioxide coated silicon wafer 11 is placed in a Varian electron beam vacuum deposition system. A 200 Å layer of 99.99% purity aluminum is deposited on the wafer as bottom electrode 12. Aluminum electrode 12 is coated with a 10 $\mu$m film of a U.V. curable epoxy (Norland 60) by spinning at 2500 rpm, and then curing with a high pressure Hg lamp for 10 minutes to form a hard and smooth dielectric buffer 14 coating.

Coated wafer 11 is placed in the Varian vacuum deposition equipment, and a 200 Å aluminum layer is deposited on dielectric buffer 14. Az 1518 positive photoresist (Hoechst) is spin coated on the aluminum layer with a Solitec model 5100 coater. A 1.5 $\mu$m photoresist coating is achieved by spinning at 500 rpm for 30 seconds. The photoresist coating is patterned by placing wafer 11 in contact with a mask of desired periodicity in a Karl Suss MJB 3 mask aligner and exposing the masked coating to 405 nm radiation (70 mJ/cm$^2$). The patterned photoresist is developed with AZ developer in water (1:1) over a period of 60 seconds, and the developing cycle is terminated by washing with deionized water. The photoresist coating is baked in a vacuum oven at 120° C. for 45 minutes. The exposed aluminum pattern is etched with type A etchant (Transene Corp.) at 50° C. for 20 seconds and the etched surface is rinsed with deionized water. The remaining photoresist is washed off with acetone and rinsed with deionized water. The periodicity of grating electrode 15 is 12 $\mu$m.

A 15% by weight solution of polymethyl methacrylate in cyclohexanone is spun at 1200 rpm to form a 2 $\mu$m thick film as lower cladding layer 16, and the film is dried in an oven at 160° C. for 2 hours. A 15% by weight solution of a copolymer (50/50) of methyl methacrylate/4-(6-methacroyloxyhexyloxy)-4'-nitrostilbene ($T_g$, 90° C.) in cyclohexanone is spun at 6000 rpm to form a 1.4 $\mu$m film as waveguiding layer 18. The film is dried in an oven for 2 hours at 160° C. A 15% by weight solution of polymethyl methacrylate in cyclohexanone is spun at 1200 rpm to provide a 2 $\mu$m thick film as top cladding layer 19, and the film is dried in an oven at 160° C. for 2 hours. An aluminum top electrode 20 is deposited in a Varian electron beam deposition system to a film thickness of 1000 Å on top cladding layer 19.

Wires are bonded to the three electrodes, and the laminated structure is placed in a Mettler hot stage and heated to 90° C. Two dipolar voltage supplies (EG&G Ortec model 556 H) are attached to the electrodes, such that the ground is attached to top electrode 20, and the positive and negative voltages to grating electrode 15 and bottom electrode 12, respectively. +385 V is applied between grating electrode 15 and ground electrode 20, and −1113 V is applied between bottom electrode 12 and ground electrode 20. This provides an electric field of 72 V/$\mu$m in the waveguide region and a field of 150 V/$\mu$m in the dielectric buffer 14 zone.

The polymeric waveguiding medium is poled in a periodic pattern of alternating polarity. The waveguide structure then is cooled to room temperature while maintaining the electric field. Slab waveguide device 10 is placed on a rotation stage, and a 1.3 $\mu$m light from a Quantel laser system (10 ns, 0.1 mJ) is photomultiplier tube with narrow band interference filter (0.65 $\mu$m) is utilized in the detection system. Waveguide device 10 is rotated until the correct periodicity is obtained. A large increase in second harmonic intensity is observed, indicating that the poled waveguiding medium has achieved phase-matching of fundamental and second harmonic waves.

EXAMPLE II

This Example illustrates the construction and operation of an optical frequency converting module in a linear rib waveguide in accordance with the present invention.

A commercially available silicon dioxide coated silicon wafer is placed in a Varian electron beam vacuum deposition system. A 200 Å layer of 99.99% purity aluminum is deposited on the wafer as a bottom electrode. The aluminum electrode is coated with 10 μm film of a u.v. curable epoxy (Norland 60) by spinning at 2500 rpm, and curing the film with a high pressure Hg lamp for 10 minutes to form a hard and smooth dielectric buffer coating. The wafer is placed in the Varian vacuum deposition equipment., and a 200 Å aluminum layer is deposited on the epoxy coating. Az 1518 positive photoresist (Hoechst) is spin coated on the aluminum layer with a Solitec model 5100 coater. A 1.5 μm photoresist coating is achieved by spinning at 5000 rpm for 30 seconds. The photoresist coating is dried in a vacuum oven at 90° C. for 30 minutes. The photoresist coating is patterned by placing the wafer in contact with a mask of desired periodicity in a Karl Suss MJB 3 mask aligner, and exposing the masked coating to 405 nm radiation (70 mJ/cm$^2$). The patterned photoresist is developed with AZ developer in water (1:1) over a period of 60 seconds, and the developing cycle is terminated by washing with deionized water. The photoresist coating is baked in a vacuum oven at 120° C. for 45 minutes. The exposed aluminum pattern is etched with type A etchant (Transene Corp.) at 50° C. for 20 seconds, and the etched surface is rinsed with deionized water. The remaining photoresist is washed off with acetone and rinsed with deionized water. The periodicity of the electrodes is 12 μm.

A 15% by weight solution of polymethyl methacrylate in cyclohexanone is spun at 1200 rpm to provide a 2 μm thick film as a lower cladding layer, and the film is dried in an oven at 160° C. for 2 hours. A 15% by weight solution of a copolymer (50/50) of methyl methacrylate/4-(6-methacroyloxyhexyloxy)-4'-nitrostilbene ($T_g$, 90° C.) in cyclohexanone is spun at 6000 rpm to form a 1.4 μm film as a waveguiding layer, and the film is dried in an oven for 2 hours at 160° C. A 5% by weight solution of high molecular weight polymethyl methacrylate (Aldrich) in trichloropropane is spun at 4000 rpm to form a 0.2 μm film as a cladding layer, and the film is dried in an oven at 160° C. for 2 hours. A light field mask containing the design of a linear waveguide (Photronics Lab) is placed in a Karl Suss MJB 3 mask aligner. It is exposed to 254 nm radiation for 3 minutes at 5 mJ/cm$^2$. The exposed areas are removed with methyl isobutyl ketone to form 5 μm wide ribs of polymethyl methacrylate. The ribs are coated with a 35% polysiloxane solution in butanol to form a 2 μm film, and the film is baked at 160° C. for two hours. An aluminum top electrode is deposited in a Varian electron beam deposition system to a film thickness of 1000 Å.

Wires are bonded to the three electrodes, and the laminated structure is placed in a Mettler hot stage and heated to 90° C. Two bipolar voltage supplies (EG&G Ortec model 556 H) are attached to the electrodes, such that the ground is attached to the top electrode and the positive and negative voltages to the grating electrode and bottom electrode, respectively. +385 V is applied between the grating electrode and the ground electrode, and −1113 V is applied between the bottom electrode and the ground electrode. This provides an electric field of 72 V/μm in the waveguiding medium, and a field of 150 V/μm in the dielectric buffer zone.

The polymeric waveguiding medium is poled, and the waveguide structure then is cooled to room temperature while maintaining the electric field. The waveguide device is placed on a stage, and a 1.3 μm light from a Quantel laser system (10 ns, 0.1 mJ) is coupled with microscope lenses into the waveguide. A photomultiplier tube with narrow band interference filter (0.65 μm) is employed in the detection system. Fine tuning to obtain phase-matching is accomplished by applying heat to the waveguide device. At the phase-matching temperature a large increase in second harmonic intensity is observed, indicating that the poled waveguiding medium has achieved phase-matching of fundamental and second harmonic waves.

Another method of fine tuning is to vary the wavelength of the laser source. At the phase-matching wavelength, there is a large increase in second harmonic intensity.

EXAMPLE III

This Example illustrates the construction and operation of a rotating Transverse Electric-Transverse Magnetic (TE-TM) polarization slab waveguide electrooptic modulator.

A commercially available silicon dioxide coated silicon wafer is placed in a Varian electron beam vacuum deposition system. A 200 Å layer of 99.99% purity aluminum is deposited on a wafer as a bottom electrode. The aluminum electrode is covered with 10 μm of a u.v. curable epoxy (Norland 60) by spinning at 2500 rpm, and then curing with a high pressure Hg lamp for 10 minutes to form a hard and smooth coating. The epoxy coated wafer is placed in the Varian vacuum deposition equipment, and a 200 Å aluminum layer is deposited. AZ 1518 positive photoresist (Hoechst) is spin coated on the aluminum layer with a Solitec model 5100 coater. A 1.5 μm photoresist coating is achieved by spinning at 5000 rpm for 30 seconds. The photoresist coating is dried in a vacuum oven at 90° C. for 30 minutes. The photoresist coating is patterned by placing the wafer in contact with a mask of desired periodicity in a Karl Suss MJB 3 mask aligner and exposing the masked coating to 405 nm radiation (70 mJ/cm$^2$). The patterned photoresist is developed with AZ developer in water (1:1) over a period of 60 seconds, and the developing cycle is terminated by washing with deionized water. The photoresist coating is baked in a vacuum oven at 120° C. for 45 minutes. The exposed aluminum pattern is etched with type A etchant (Transene Corp.) at 50° C. for 20 seconds, and the etched surface is rinsed with deionized water. The remaining photoresist is washed off with acetone and rinsed with deionized water. The periodicity of the electrodes is 26 μm.

U.V. curable epoxy (Norland 60) is spun at 10,000 rpm to form a 2.5 μm film on the grating electrode, and the film is cured under Hg lamps for 10 minutes. A 20% by weight solution of a copolymer (50/50) of methyl methacrylate/4-[N-(2-methacroyloxyethyl)-N-methylamino]-4'-nitrostilbene ($T_g$, 133° C.) cyclohexanone is spun at 2000 rpm to form a 2.0 μm film as a waveguiding layer, and the film is dried in an oven for 2 hours 160° C. A U.V. curable epoxy (Norland 60) is spun at 10,000 rpm to form a 2.5 μm film, and the film is cured under Hg lamps for 10 minutes. An aluminum top electrode is deposited in a Varian electron beam deposition system to a film thickness of 1000 Å on the epoxy layer.

Wires are bonded to the three electrodes, and the laminated structure is placed in a Mettler hot stage and heated to 90° C. Two bipolar voltage supplies (EG&G Ortec model 556 H) are attached to the electrodes, such that the ground electrode is attached to the top electrode, and the positive and negative voltages to the grating electrode and bottom electrode, respectively +525 V is applied between the grating electrode and the ground electrode, and −1275 V is applied between the bottom electrode and the ground electrode. This provides an electric field of 75 V/μm across the waveguiding medium, and a field of 180 V/μm across the dielectric buffer zone. The polymeric waveguiding medium is poled in a periodic pattern of alternating polarity. The electrooptic structure then is cooled to room temperature while maintaining the electric field. With a poling field of 75 V/μm the induced birefringence in the waveguide is:

$$\Delta n = n(TM) - n(TE) = 0.05$$

The required periodicity for phase matching is given by:

$$\Lambda = \frac{\lambda}{\Delta n} = 26 \ \mu m$$

Modulating electrodes have to be added to the periodically poled waveguide in order to test the mode conversion. Symmetry requires that the electric field is applied across rather than through the waveguiding medium. This is accomplished by defining two strip sections in the top aluminum electrode parallel to the wave propagation direction, utilizing lithographic procedures as previously described. The parallel electrode sections are formed 50 μm apart.

The $r_{31}$ coefficient is used for TE/TM conversion, and $r_{15}$ is used for TM/TE conversion. For a poled waveguiding medium:

$$r_{31} = r_{15} = \frac{r_{33}}{3}$$

since $r_{33}=9$ pm/V for the Example polymer, $r_{31}=r_{15}=3$ pm/V.

The coupling length for TE/EM conversion is estimated with the equation:

$$L = \frac{\pi}{2K}$$

where $$K = \frac{n^3}{\lambda} r_{15} E_{mod}$$

When 500 volts are applied across the 50 6l μm gap between the strip electrodes ($E_{mod}=10^7$ V/m), then mode conversion occurs within a distance of 3.3 cm.

A 1.3 μm light beam is focussed weakly to provide a 50 μm spot on the end face of the slab waveguide, such that the spot lies between the two strip electrode positions. The laser is polarized either verticvally (TM) or horizontally (TE), and 500 volts is applied across the strip electrodes. It is observed that the output polarization is orthogonal to the input polarization. Additional fine tuning of phase-matching is accomplished by applying heat to the waveguide device to effect changes in refractive indices.

EXAMPLE IV

This Example illustrates the construction and operation of a rotating TE-TM polarization channel waveguide electrooptic modulator.

A commercially available silicon dioxide coated silicon wafer is placed in a Varian electron beam vacuum deposition system, and a 200 Å layer of 99.99% purity aluminum is deposited on the wafer as a bottom electrode. The aluminum electrode is coated with a 10 μm film of a U.V. curable epoxy (Norland 60) by spinning at 2500 rpm, and curing the film with a high pressure Hg lamp for 10 minutes to form a hard and smooth coating. The wafer is placed in the Varian vacuum deposition equipment, and a 200 Å aluminum layer is deposited on the epoxy layer. AZ 1518 positive photoresist (Hoechst) is spin coated on the aluminum layer with a Solitec model 5100 coater. A 1.5 μm photoresist coating is achieved by spinning at 5000 rpm for 30 seconds. The photoresist coating is dried in a vacuum oven at 90° C. for 30 minutes. The photoresist coating is patterned by placing the wafer in contact with a mask of desired periodicity in a Karl Suss MJB 3 mask aligner and exposing the masked coating to 405 nm radiation (70 mJ/cm²). The patterned photoresist is developed with AZ developer in water (1:1) over a period of 60 seoonds, and the developing cycle is terminated by washing with deionized water. The photoresist coating is baked in a vacuum oven at 120° C. for 45 minutes. The exposed aluminum pattern is etched with type A etchant (Transene Corp.) at 50° C. for 20 seconds, and the etched surface is rinsed with deionized water. The remaining photoresist and washed off with acetone and rinsed with deionized water. The periodicity of the electrodes is 26 μm.

A U.V. curable epoxy (Norland 60) is spun at 10,000 rpm to provide a 2.5 μm film, and the film is cured under Hg lamps for 10 minutes. A 20% by weight solution of a copolymer (50/50) of methyl methacrylate/4-[N-(2-methacroyloxyethyl)-N-methylamino]-4'-nitrostilbene ($T_g$, 133° C.) in cyclohexanone is spun at 2000 rpm to form a 2.0 μm film as a waveguiding layer, and the film is dried in an oven for 2 hours at 160° C.

A linear rib waveguide is formed in the following manner. A 5% by weight solution of high molecular weight polymethyl methacrylate in trichloropropane is spun at 4000 rpm to provide a 0.2 μm film, and the film is dried at 160° C. for two hours. A light field mask (Photronics Lab.) containing linear waveguide patterns is placed in a Karl Suss MJB 3 mask aligner. The laminated structure then is placed in the aligner, and exposed to 254 nm radiation (5 mJ/cm²) for 3 minutes. The exposed regions are removed with methyl isobutyl ketone solvent, and 5 μm wide ribs of polymethylmethacrylate are formed. A 35% polysiloxane solution in butanol (Owens Illinois, GR 650 L, n=1.42) is spun in contact with the ribs at 7000 rpm to a film thickness of 2 μm, and the film is baked at 150° C. for 3 hours. An aluminum top electrode is deposited in a Varian electron beam deposition system to form a film thickness of 1000 Å.

Wires are bonded to the three electrodes, and the structure is placed in a Mettler hot stage and heated to 90° C. Two bipolar voltage supplies (EG&G Ortec model 556 H) are attached to the electrodes, such that the ground is attached to the top electrode and the positive and negative voltages to the grating electrode and bottom electrode, respectively. +487 V is applied between the grating electrode and the ground electrode, and −1237 V is applied between the bottom electrode and the ground electrode. This provides an electric field of 75 V/μm in the waveguiding medium, and a field of 172 V/μm in the dielectric buffer zone. The polymeric waveguiding medium is poled, then the electrooptic structure is cooled to room temperature while maintaining the electric field. With a poling field of 75 V/μm the induced birefringence in the waveguide is:

$$\Delta n = n(TM) - n(TE) = 0.05$$

The required periodicity for phase matching is given by:

$$\Lambda = \frac{\lambda}{\Delta n} = 26 \text{ μm}$$

Modulating electrodes have to be added to the periodically poled waveguide in order to test the mode conversion. Symmetry requires that the electric field is applied across rather than through the waveguiding medium. This is accomplished by defining two strip sections in the top aluminum electrode parallel to the wave propagation direction, utilizing lithographic procedures as previously described. The parallel electrode sections are formed 5 μm apart.

The $r_{31}$ coefficient is used for TE/TM conversion, and $r_{15}$ is used for TM/TE conversion. For a poled waveguiding medium:

$$r_{31} = r_{15} = \frac{r_{33}}{3}$$

Since $r_{33} = 9$ pm/V for the Example polymer, $r_{31} = r_{15} = 3$ pm/V.

The coupling length for TE/TM conversion is estimated with the equation:

$$L = \frac{\pi}{2K}$$

where $$K = \frac{n^3}{\lambda} r_{15} E_{mod}$$

When 50 volts are applied across the 5 μm gap between the strip electrodes ($E_{mod} = 10^7$; V/m), then mode conversion occurs within a distance of 3.3 cm.

A 1.3 μm light beam is focussed into the channel waveguide. The laser is polarized either vertically (TM) or horizontally (TE), and 500 volts is applied across the strip electrodes. It is observed that the output polarization is orthogonal to the input polarization. Additional fine tuning of phase-matching is accomplished by applying heat to the waveguide device to effect changes in refractive indices.

What is claimed is:

1. An optical waveguide which has a thin film laminated matrix comprising:

(a) a substrate which supports a first electrode layer;
(b) a dielectric buffer layer which is in coextensive proximity with the electrode layer;
(c) a second electrode layer having a spatial periodic structure in proximity with the buffer layer;
(d) a polable organic waveguiding medium layer in proximity with the second electrode layer and buffer layer; and
(e) a third electrode layer in proximity with the organic waveguiding medium;

wherein the first and second electrodes are adapted to apply electric fields of opposite polarity in conjunction with the third electrode functioning as a zero potential ground electrode, and the organic waveguiding medium has a bidirectional poled molecular configuration and a radiation wave phase-matching coherence length about equal to the periodicity of the second electrode.

2. An optical waveguide in accordance with claim 1 wherein the organic waveguiding medium has a two-dimensional channel structure for single mode wave transmission.

3. An optical waveguide in accordance with claim 1 wherein the periodicity (Λ) the waveguiding medium for phase-matching of different radiation velocities is determined by the inverse difference of the propagation constants:

$$\Lambda = \frac{2\pi}{\Delta k}$$

where $\Delta k = k_p^{(1)} - K_s^{(2)} - K - i^{(3)}$, and $k_p$ is the pump radiation constant, $k_s$ is the signal radiation constant, and $k_i$ is the idler radiation constant.

4. An optical waveguide in accordance with claim 1 wherein the periodicity (Λ) of the waveguiding medium for phase-matching of different radiation velocities is determined by the inverse difference of the propagation constants:

$$\Lambda = \frac{2\pi}{\Delta k}$$

where $\Delta k = k^{TE} - K^{TM}$, and $k^{TE}$ is the transverse electric mode radiation constant and $k^{TM}$ is the transverse magnetic mode radiation constant.

5. An optical waveguide in accordance with claim 1 wherein the periodicity (Λ) of the waveguiding medium for phase-matching of different radiation velocities is determined by the inverse difference of the propagation constants:

$$\Lambda = \frac{2\pi}{\Delta k}$$

where $\Delta k = k^{opt} - k^{micro}$, and $k^{opt}$ is the optical wave constant and $k$ is the microwave constant.

6. An optical waveguide in accordance with claim 1 wherein the organic waveguiding medium comprises a polymeric thin film which exhibits second order nonlinear optical susceptibility $\chi^{(2)}$.

7. An optical waveguide which has a thin film laminated matrix comprising:

(a) a substrate which supports a first electrode layer;
(b) a dielectric buffer layer which is in coextensive proximity with the electrode layer;
(c) a second electrode having a spatial periodic structure in proximity with the buffer layer;

(d) a first thin film cladding of a polable side chain polymer in proximity with the second electrode layer and buffer layer;

(e) a waveguiding medium layer of a polable side chain polymer in coextensive contact with the first cladding layer and with a higher refractive index than the cladding layer;

(f) a second thin film cladding of a polable side chain polymer in coextensive contact with the waveguiding medium layer and with a lower refractive index than the waveguiding layer; and (g) a third electrode in proximity with the second thin film cladding;

wherein the first and second electrodes are adapted to apply electric fields of opposite polarity in conjunction with the third electrode functioning as a zero potential ground electrode, and the waveguiding medium and thin film cladding polymers have a bidirectional poled molecular configuration of the polymer side chains and exhibit second order nonlinear optical susceptibility $\chi^{(2)}$, and have a radiation wave phase-matching coherence length about equal to the periodicity of the second electrode.

8. An optical waveguide in accordance with claim 7 wherein the waveguiding medium has a two-dimensional channel structure, and is adapted to perform with an optical loss of less than about two decibels per centimeter under radiation wave propagating conditions.

9. An optical waveguide in accordance with claim 7 wherein the waveguiding medium exhibits a second order nonlinear optical susceptibility $\chi^{(2)}$ of at least about $1 \times 10^{-8}$ esu as measured at 1.91 μm excitation wavelength.

10. An optical waveguide in accordance with claim 7 wherein each of the side chain polymers in the waveguiding medium and the cladding thin films is characterized by a recurring monomeric unit corresponding to the formula:

where P′ is a polymer main chain unit, S′ is a flexible spacer unit having a linear chain length between about 2–20 atoms; M, is a pendant chromophore which exhibits second order nonlinear optical susceptibility $\chi^{(2)}$, and where the pendant side chains consist of at least 25 percent of the polymer, and the polymer has a glass transition temperature above about 40° C.

11. An optical waveguide in accordance with claim 10 wherein the M′ group in the formula contains a biphenyl structure.

12. An optical waveguide in accordance with claim 10 wherein the M′ group in the formula contains a stilbene structure.

13. An optical waveguide in accordance with claim 10 wherein the side chain polymer in the waveguiding medium is characterized by a recurring monomeric unit corresponding to the formula

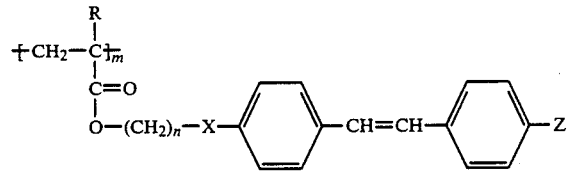

where m is an integer of at least 5; n is an integer between about 2–20; X is —NR—, —O— or —S—; R is hydrogen or a $C_1$–$C_4$ alkyl; and Z is —$NO_2$, —CN, —$CF_3$, —CH=C(CN)$_2$, —C(CN)=C(CN)$_2$ or —$SO_2CF_3$.

14. An optical waveguide in accordance with claim 10 wherein the side chain polymer in the waveguiding medium is a copolymer of 4-[N-(2-methacroyloxyethyl)-N-methylamino]-4′nitrostilbene and a $C_1$–$C_6$ alkyl acrylate or methacrylate.

15. A method for fabricating an optical waveguide having a thin film laminated matrix which comprises:

(a) forming a first electrode layer on a supporting substrate;

(b) applying a dielectric buffer layer which is in coextensive proximity with the electrode layer;

(c) forming a second electrode layer having a spatial periodic structure in proximity with the buffer layer;

(d) forming a polable organic waveguiding medium layer in proximity with the second electrode layer and buffer layer; and (e) forming a third electrode layer in proximity with the organic waveguiding medium;

wherein the first and second electrodes are adapted to apply electric fields of opposite polarity in conjunction with the third electrode functioning as a zero potential ground electrode, and the organic waveguiding medium is provided with a bidirectional poled molecular configuration and a radiation wave phase-matching coherence length about equal to the periodicity of the second electrode.

16. A method in accordance with claim 15 wherein the organic waveguiding medium has a two-dimensional channel structure for single mode wave transmission.

17. A method in accordance with claim 15 wherein the organic waveguiding medium comprises a polymer with side chain chromophores which have a noncentrosymmetric molecular orientation of periodic reverse polarity, and the waveguiding medium exhibits second order nonlinear optical susceptibility $\chi^{(2)}$.

18. A method in accordance with claim 15 wherein the organic waveguiding medium is positioned between two organic cladding thin films, and the waveguiding medium and cladding thin films each comprises a side chain polymer layer.

* * * * *